Nov. 2, 1965 M. M. BIRNBAUM ETAL 3,215,825

MULTIPLIER CIRCUIT

Filed July 3, 1961 3 Sheets-Sheet 1

INVENTORS
Morris M. Birnbaum
Phil M. Salomon
BY [signature] ATTY.
[signature] AGENT United States Patent Office 3,215,825

Patented Nov. 2, 1965

3,215,825

MULTIPLIER CIRCUIT

Morris M. Birnbaum, Pasadena, and Phil M. Salomon, Sunland, Calif., assignors to General Precision, Inc., a corporation of Delaware Filed July 3, 1961, Ser. No. 121,720

7 Claims. (Cl. 235—194)

Figure 1:
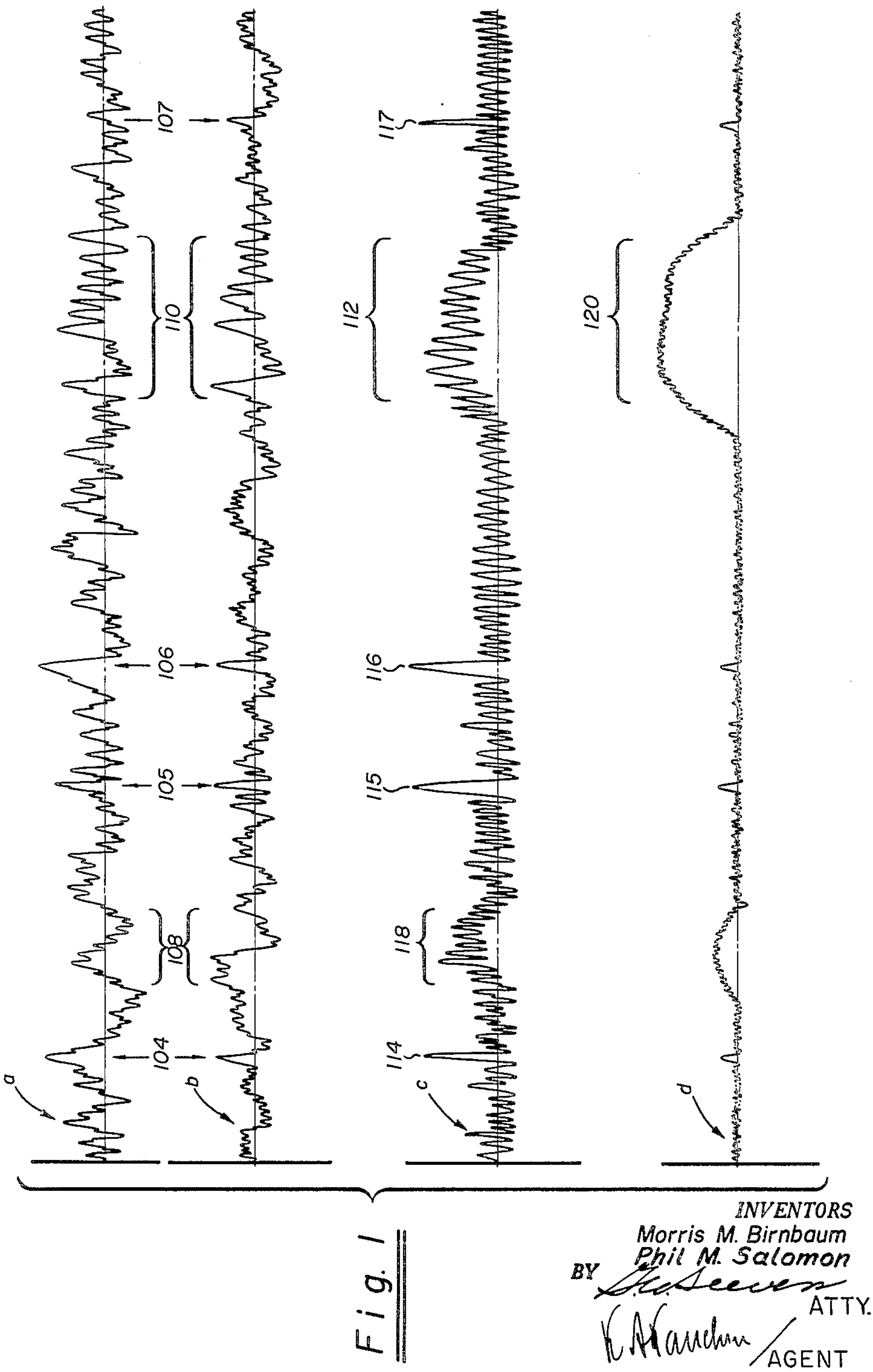

The present invention relates to methods and means for indicating phases of identity or near-identity in the trend of two continuous signals. The process of comparing two continuous signals with a view to discovering phases of identity or near-identity in their trends is known as correlation and arrangements for making such comparisons and indicating the results thereof are known as correlation arrangements and more particularly as correlation circuitry.

Correlation techniques are used in many fields of the art such as for instance in the field of electronically plotting contour lines from oriented stereoscopically related photographs as described in the co-pending U.S. patent application of Birnbaum and Wichman Serial 4,404 filed on January 25, 1960.

In automatic contour plotting arrangements of the type described in the above identified patent application, two oriented stereoscopically related diapositives of a certain terrain are scanned in synchronism with rays of light, and upon passage through the diapositives the scanning rays are directed against photo-sensitive devices to produce, or affect, a current flow therethrough. When these rays pass through unrelated spots in the two diapositives, i.e., spots that do not represent the same spot in nature, their intensity is reduced to different degrees by the densities of the developed photographic layers at the two spots and hence the flow of current through the photo-sensitive devices is affected differently. However, when the scanning rays pass through spots in the diapositives corresponding to one and the same spot in nature, they are modulated in an identical or near-identical manner, because corresponding spots on the two diapositives have approximately the same degree of opaqueness. Hence, upon passage through the diapositives the two scanning rays of light produce identical or near-identical variations in the output of the photo-sensitive devices associated with the diapositives. This may indicate that the rays have encountered a spot in nature that forms part of a desired contour line.

Correlation circuitry serves to compare the outputs of the two photo-sensitive devices continually during the scanning operation and to indicate dependably whenever the variations in said outputs become identical or nearly identical for an appreciable period of time. In automatic contour plotters of the type here under consideration the task of correlation circuitry to interpret the output of two photo-sensitive devices and indicate a point of the desired contour line is complicated by the fact that the scanning rays of light might encounter points on the diapositives that intercept the same amount of light due to the fact that they have accidentally the same degree of density, but which are not in fact corresponding spots in the diapositives, and do not represent the same spot in nature.

It is an object of the present invention to provide a correlation method and arrangement for interpreting the output of two photo-sensitive devices such as are used in contour plotters behind the scanned diapositives, which do not supply an erroneous response when the scanning rays of light encounter unrelated spots of an accidentally identical degree of density upon the diapositives.

The correlation method and arrangement of the present invention is based upon the realization that the scanning rays of light in approaching and passing over related spots, i.e., spots representing one and the same spot in nature, are bound to pass over areas in the diapositives which represent the same area in nature and which are therefore bound to produce increasingly similar and eventually identical responses in the photo-sensitive devices, whereas the identity of responses produced in the photo-sensitive devices when the points of light encounter spots in the diapositives that are unrelated and are only accidentally of equal density, is more likely to be an instantaneously and solitary one since the areas surrounding such spots of accidentally equal density will most likely be distinctly different and therefore produce markedly different responses in the photo-sensitive devices directly before the light points sweep over, and directly after they have swept over these misleadingly identical spots. The correlation method and arrangement of our invention is further based upon the fact that the product of two equal factors is always larger than the product of unequal factors which add up to the same total as the equal factors.

To distinguish equal responses, of the photo-sensitive devices, which identify a spot of the proper altitude in nature from an instantaneous equality in the responses of said devices produced by accidental identity in the density of unrelated spots encountered by the light rays, we provide circuitry that multiples the output of both photo-sensitive devices in quick succession and continually integrates and averages a predetermined sequence of the resultant products to determine whether any such integrated and averaged sequence of products of the outputs of the photo-sensitive devices has a higher than average value. If the sequence of continually integrated and averaged products is sufficiently large, their sum total will remain substantially the same as long as the scanning rays of light do not sweep over truly related spots in the diapositives, even if they encounter spots of accidentally identical density which produce sporadically equal responses in the photo-sensitive devices; for the peaks thus produced by the multiplication of equal factors are solitary and do not appreciably affect the general trend of the integrated products. However, if the scanning light rays sweep over related areas in the two diapositives, the outputs of the two photo-sensitive devices are not only identical as the light rays pass over precisely the related spots, they will be nearly identical for some time before the light rays reach said spots and for some time after they have passed over said spots, establishing thus a sequence of products of identical and/or nearly identical factors which in turn produce a pronounced increase in the value of the averaged integrated intervals, as compared with the average value ordinarily obtained by continually integrating and averaging an advancing sequence of the products of the outputs of the photo-sensitive devices. Such an extraordinary increase in the average value of an averaged integrated sequence of the products of two variables is known as a "correlation excess."

To carry out the above described correlation method successfully, it is necessary that instantaneous values in the output of the two photo-sensitive devices be multiplied in rapid succession, i.e., at frequencies of up to 1,000,000 products per second.

It is another object of our invention to provide a rapidly and reliably operating multiplier circuit.

More particularly it is an object of our invention to provide a rapidly operating analog multiplier circuit that provides reliable results over long intervals of operation.

These and other objects of the present invention will be apparent from the following description of the accompanying drawings which illustrate certain preferred embodiments thereof and wherein—

FIGURE 1 is a diagram illustrating the responses obtained from two photo multiplier tubes in an automatic contour plotting arrangement and the manner in which these responses are correlated in accordance with our invention to produce a correlation excess that indicates phases of true identity in their trends.

Figure 7:
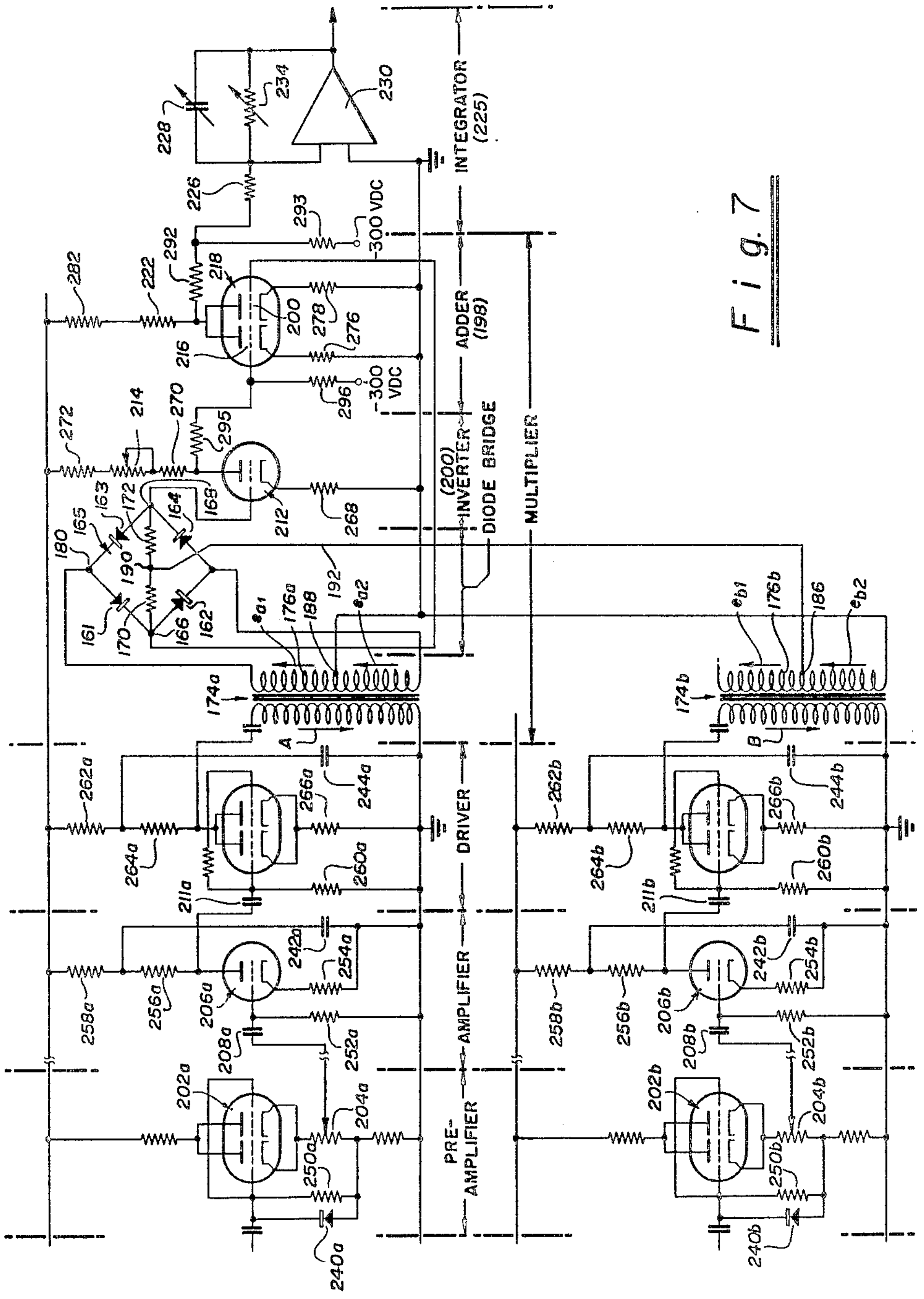

FIGURES 2, 3, 4, 5 and 6 are graphs illustrating the manner in which a correlation excess may be electronically processed to adapt it better for application to an indicating apparatus; and FIGURE 7 is a diagram illustrating correlation circuitry constructed to perform in the manner illustrated by the diagram of FIGURE 1 and including a novel improved multiplier circuit embodying the present invention.

In FIGURE 1, the graph *a* represents the amplified and filtered A.C. output of a photo multiplier tube such as may be employed in connection with one of the diapositives of an automatic contour plotting arrangement of the type mentioned hereinbefore and described in the above mentioned patent application Serial No. 4,404, and graph *b* represents the amplified and filtered A.C. of the photo multiplier tube associated with the other diapositive.

The two graphs differ markedly most of the time, but have several momentary points of coincidence as marked out by the arrows 104, 105, 106, 107 and the bracket 108. These points of coincidence are of brief duration and represent instances where at the scanning points of light swept over spots in the diapositives, that are of accidentally identical density, and are not related spots that represent one and the same spot in nature. In the region marked by the bracket 110, however, the graphs *a* and *b* developed a congruence of some duration indicating that the scanning points of light swept over truly related areas in the two diapositives.

The graph *c* below graphs *a* and *b*, represents the product of simultaneous values of the voltages represented by the graphs *a* and *b*. While graph *c* exhibits a marked rise 112 in the region 110 where the graphs *a* and *b* have a congruent course, they also exhibit marked rises at other points, such as identified by the numerals 114, 115, 116, 117 and the bracket 118, which although of lesser duration than the rise 112, might be sufficiently pronounced to produce a spurious response of the contour indicating means of an automatic contour plotter.

In accordance with our invention we therefore integrate progressively, a predetermined sequence of the products represented by the curve *c* and divide each resultant sum by the number of products contained therein arriving at values represented by the formula:

$$E=\frac{1}{T}\int_0^T a\cdot b\,dt$$

wherein T is the time interval required to integrate a predetermined number of products. The resultant values differ very little from each other as long as the signal levels represented by the graphs *a* and *b* remain unrelated and have only sporadic, instantaneous points of coincidence. This is illustrated by the graph *d* which represents the averaged outputs of the integrator plotted against time. However, as soon as the averaged outputs of the integrator include products resulting from a sequence of equal or nearly equal factors, the graph *d* develops a pronounced rise 120 over its ordinary course, which is clearly indicative of the fact that the scanning light points in the automatic contour plotter are in the process of sweeping over truly related areas in the two diapositives and have therefore found a point in the desired contour line. In automatic contour plotters, the responses obtained in the manner illustrated at 120 in FIGURE 1, may be employed for modulating the sweeping electron beam of a cathode ray tube so as to produce on the screen of the tube a visible mark representative of a point in the desired contour line.

For clarity of indication, each response 120 obtained in the manner illustrated in FIGURE 1, may be processed in suitable circuitry to narrow its line of duration and increase its amplitude.

Figures 2, 3, 4, 5, 6:
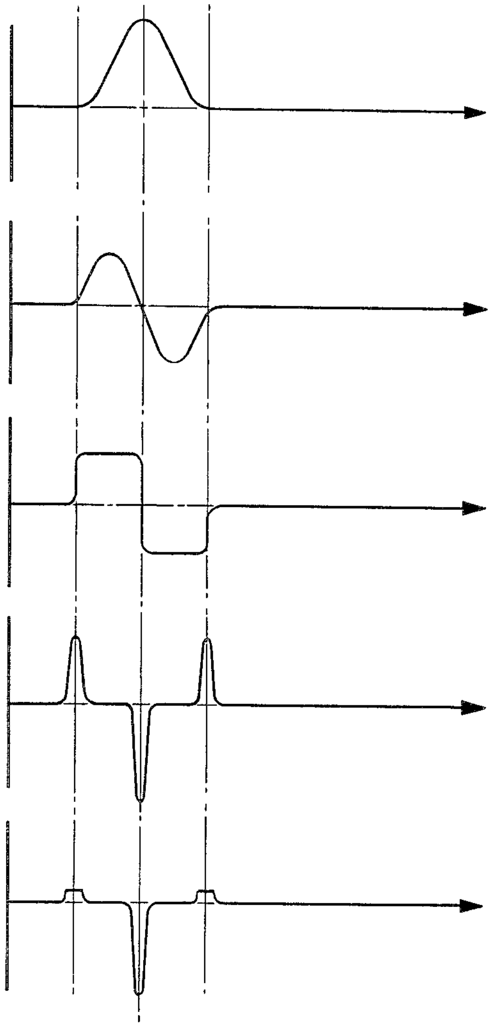

An exemplary method of accomplishing this is illustrated in FIGURES 2 to 6. FIGURE 2 represents a voltage output similar to the rise 120 in graph *d* of FIGURE 1. Said voltage output may be delivered to a differentiator circuit which converts it into a response as illustrated in FIGURE 3. The output of the differentiator circuit may then be delivered to a voltage squaring circuit which changes it into the shape illustrated in FIGURE 4. The squared voltage output of the squaring circuit is then delivered to another differentiator circuit whereat the response illustrated in FIGURE 4 is converted into the response illustrated in FIGURE 5. Finally, we pass the signal illustrated in FIGURE 5 through a clipper circuit wherein its positive phase is eliminated leaving a narrow negative response of substantial amplitude as illustrated in FIGURE 6. After amplification in a video amplifier the clipped and amplified signal may be delivered to the control grid of a cathode ray tube to modulate the electron beam emitted by the cathode of said tube, and in this manner indicate visibly identical phases in the trend of the compared signals.

The multiplier employed in the correlation circuitry of the invention is an analog multiplier that operates on the principle of the "quarter-square" method which is based upon the equation:

$$AB=\frac{1}{4}[(A+B)^2-(A-B)^2]$$

wherein A and B are the two signals to be multiplied.

Having reference to FIGURE 7, the multiplier of the invention comprises four diodes 161, 162, 163 and 164 connected to form a bridge circuit 165, and interposed between the left junction 166 and the right junction 168 of the bridge circuit are two resistors 170 and 172 which are of equal value and of a magnitude substantially smaller than the resistances of the diodes in the direction in which they conduct current flow. The two signals to be multiplied are delivered to the bridge circuit by means of two transformers **174*a* and 174*b*, respectively, the arrangement being that such that the secondary winding 176*a* of transformer 174*a* applies one signal across the top and bottom junctions 180 and 182 of the bridge circuit and the other signal is applied from one of the halves into which the secondary winding 176*b* of the transformer 174*b* is divided by a center tap 186, across a center tap 188 of the secondary winding 176*a* of transformer 174*a* and the junction 190 of the two resistors 170 and 172. The diodes of the bridge 165** are arranged in such a manner as to allow electron current flow in the right side of the bridge and to block current flow in the left side of the bridge for positive going signals where $e_a$ is greater than $e_b$ and to allow electron current flow in the left side of the bridge and block current flow in the right side of the bridge for negative-going signals where $e_a$ is greater than $e_b$. Said diodes are matched as closely as possible, and the signal voltage levels applied to said diodes are so dimensioned that the currents flowing through the diodes in a forward direction can be represented by the formula:

$$i \cong k(e)^2$$

wherein *i* is the current flowing through the diode in the forward direction, *k* is a constant of proportionality for the diode involved, and *e* is the net voltage across the diodes in its conducting direction.

To understand how the described multiplier circuit operates, let us assume that signals A and B delivered to the transformers **174*a* and 174*b* respectively, cause voltages $e_a$ and $e_b$ to be induced in the secondaries 176*a* and 176*b* of said transformers, and since both said secondaries are center tapped, the voltages developed across said secondaries may be regarded as divided into two equal portions $e_{a1}$, $e_{a2}$ and $e_{b1}$, $e_{b2}$ respectively, as marked out in FIGURE 7. Assuming these voltages to be of such polarity that the electrons flow in the direction of the arrows associated with the transformers 174***a* and 174*b* and also assuming the voltage $e_a$ to be larger than the voltage $e_b$, the following voltages will be in effect across the diodes of the bridge circuit:

| | |
|---|---|
| Diode **161** | $e_{a1}-e_{b2}$ |
| Diode **162** | $e_{a2}+e_{b2}$ |
| Diode **163** | $e_{a1}-e_{b2}$ |
| Diode **164** | $e_{a2}+e_{b2}$ |

Since the larger voltage $e_{a1}$ is applied to diode 161 in the direction in which said diode blocks current flow, the net voltage $e_{a1}-e_{b2}$ is also applied to the diode in the direction in which it blocks current flow, and hence no current flows through diode 161. Also, there will be no current flow through the diode 162 since both voltages $e_{a2}$ and $e_{b2}$ are applied to the diode 162 in a direction in which the diode 162 blocks current flow. However, current will flow through the diode 163 since the voltage $e_{a1}$ is larger than the voltage $e_{b2}$ and is applied to the diode 163 in the direction in which it conducts current. As a result a current of $i=K_{163}(e_a-e_b)^2$ flows through the diode 163 and through resistor 172. Current will also flow through the diode 164 since both the voltages $e_{a2}$ and $e_{b2}$ are applied to the diode 164 in the direction in which it conducts current, and as a result thereof a current of $$i=K_{164}(e_a+e_b)^2$$

flows through the diode 164 and through resistor 172. It should be noted that the currents flowing through resistor 172 as described, flow in opposite directions. The total voltage drop across resistor 172 is therefore:

$$V=R_{172}[K_{164}(e_a+e_b)^2-K_{163}(e_a-e_b)^2]$$

and if the diodes are so chosen that $K_{163}=K_{164}$, then the right term of the above equation may be simplified as follows:

$$V=4KR_{172}e_ae_b$$

wherein $K=K_{163}$ and R is the value of resistor 172. The term 4KR is therefore a constant, and since the voltage $e_a$ is directly proportional to the signal A and the voltage $e_b$ is directly proportional to the signal B, the algebraic sum of the voltage drops across resistor 172 is representative of the product $A\times B$.

For the described multiplier circuit to be a true four quadrant multiplier, it should deliver the same product when the signals A and B reverse their directions. In this case the voltages established across the diodes of the bridge circuit would be as follows:

| | |
|---|---|
| Diode **161** | $e_{a1}-e_{b2}$ |
| Diode **162** | $e_{a2}+e_{b2}$ |
| Diode **163** | $e_{a1}-e_{b2}$ |
| Diode **164** | $e_{a2}+e_{b2}$ |

Since the voltage $e_{a1}$ is larger than the voltage $e_{b2}$ and is applied to the diode 161 in the direction in which said diode conducts current flow, a current of $i=K_{161}(e_a-e_b)^2$ flows through the diode 161 and resistor 170 from the right to left; and since both the voltages $e_{a2}$ and $e_{b2}$ are applied to the diode 162 in its conducting direction, a current of $i=K_{162}(e_a+e_b)^2$ flows through the diode 162 and resistor 170 from left to right. The net voltages in effect across diodes 163 and 164 are both applied in the direction in which these diodes block current flow so that no current will flow through either of these diodes.

The voltage drop across the resistor 170 of the bridge circuit is therefore:

$$V=R_{170}[K_{162}(e_a+e_b)^2-K_{161}(e_a-e_b)^2]$$

and if it is assumed that $K_{161}=K_{162}$, this expression may again be simplified as follows:

$$V=4KR_{170}e_ae_b$$

wherein $K=K_{161}=K_{162}$. This expression is representative of the product $A\times B$ since the term $4KR_{170}$ is a constant and the voltages $e_a$ and $e_b$ are directly proportional to the signals A and B, respectively. Thus, the algebraic sum of the voltages developed across resistor 170 is representative of the product $A\times B$ when the direction of the signals is reversed as compared with the previously described example.

From the two above discussed examples of operation, it is apparent that by measuring the total voltage drop across the resistors 170 and 172 in series between the junctions 166 and 168 of the diode bridge, it is possible to derive voltages that are indicative of the continuous products of the signals A and B irrespective of the instantaneous directions of said signals. To utilize the continuous voltage products thus obtained, it is conventional practice to connect a meter or the primary of a transformer across the junctions 166 and 168 of the diode bridge. The secondary of the transformer conventionally has been employed to operate subsequent circuitry.

Multiplier circuits of the type described give fairly accurate results at frequencies up to 15 kc. However, when operated at substantially higher frequencies, the results obtained become so inaccurate as to be useless. In order that a diode bridge operate satisfactorily as a four quadrant multiplier at high frequencies, it is necessary that its two halves be electrically identical so that the half composed of the diodes 161, 162 and the resistor 170 and the half composed of the diodes 163, 164 and the resistor 172 produce identical voltages across the resistors 170 and 172, respectively, when positive going signals and negative going signals of equal magnitude are delivered to the bridge. In reality, however, the two halves of the diode bridge are rarely, if ever, entirely identical due to inequalities of the diodes employed and especially due to inequalities in the stray capacities across these diodes, which are of increasing significance as the frequency of operation increases; and with a transformer connected across the junctions 166 and 168 of the bridge circuit to measure the algebraic sum of the voltages developed across resistors 170 and 172, there is no way to make adjustment for inequalities in the halves of the bridge circuit so as to render them operationally identical. In fact, the stray capacities between the windings of the transformer add unequally to the stray capacities of the diodes and thus render the responses of the two bridge halves at high frequencies even more unbalanced. In accordance with the invention, we obtain a four quadrant multiplier circuit that operates accurately at frequencies of the order of several hundred kc. by grounding the center point 190 of the bridge directly as indicated by the connecting line 192 in FIGURE 7. By eliminating the conventional output transformer with its harmful stray capacities, and by applying the product voltages developed across the two resistors 170 and 172 separately to the two grids of an adding stage 198, after first inverting one of said voltages in an inverter stage 200 to re-establish the conditions that existed before the center point 190 between the resistors 170 and 172 was grounded when the algebraic sum of the voltages developed across the two resistors could be measured directly across the junctions 166 and 168. When the center point of the diode bridge is grounded, whether directly or indirectly, the operation of the bridge becomes more balanced as regards the stray capacities across the diodes to ground, and when the conventional output transformer is eliminated and the product voltages are applied directly to the control grids of a vacuum tube, any spurious high frequency shunt paths established by the stray capacities of the transformer are practically eliminated since the grid-to-ground capacity of vacuum tubes is orders of magnitude smaller than the stray capacity of transformer coils of standard quality. Moreover, the necessary inter-position of an inverter stage between one side of the diode bridge and the adding stage makes it possible, by adjustment of the amplification obtainable in the inverter stage, to compensate for any inequalities in the operation of the two halves of the diode bridge so that the two halves are operationally identical. Therefore, a diode bridge multiplier circuit, as modified in accordance with our invention, is a four quadrant multiplier that produces accurate results even when operated at frequencies of 1,000,000 cycles, without need for components other than are readily available commercially.

FIGURE 7 illustrates a manner in which the new multiplier circuit is fitted into the remaining parts of the correlation circuitry of the invention. The pre-amplified outputs of two photo tubes associated with the oriented diapositives of a contour plotter of the type described in the above-mentioned patent application Serial No. 4,404 are applied to the control grids of dual triodes 202*a* and 202*b*, respectively, which are connected to operate as cathode follower stages; and the corresponding voltages developed across cathode resistors 204*a* and 204*b* are applied to the control grids of triodes 206*a* and 206*b* respectively, through blocking condensers 208*a* and 208*b*. The fluctuations in the plate currents of the triodes 206*a* and 206*b* are applied to the control grids of dual triodes 210*a* and 210*b* respectively, through another set of blocking condensers 211*a* and 211*b*.

In the event that the diapositives of the contour plotter are scanned by bundles of light rays that orignate from a common point source of light which is produced by sweeping the electron beam of a cathode ray tube at successively lower levels across a phosphor screen as disclosed in the above mentioned U.S. patent application 4,404, the blocking condensers 208*a*, 211*a*, and 208*b*, 211*b* eliminate the blanking pulses applied to said cathode ray tube from the output voltages of the photo multiplier tubes 84*a* and 84*b*. They also block the D.C. components of said output voltages. The triodes 210*a* and 210*b* are arranged to operate as driver stages for delivering the amplified and filtered output of the photo multiplier tubes through transformers 174*a* and 174*b*, respectively, to the diode bridge 165 in the manner described hereinbefore.

The product voltages developed across the resistor 172 of the diode bridge are applied to the grid of a triode 212 which forms part of the hereinbefore mentioned inverter stage 200 and which may be adjusted to unity gain so that the voltages, appear of equal size but of inverted polarity in the anode circuit of said triode. Included in said anode circuit is a potentiometer 214 by means of which the voltage fluctuations in said circuit may be adjusted to equal in magnitude the voltage fluctuations developed across resistor 170 of the diode bridge for signals of identical positive and negative magnitude. In this manner the operation of the right side of the diode bridge may be perfectly matched to the operation of the left side thereof so that any inequalities in the operation of the two sides of said diode bridge may be fully compensated. The adjusted voltage fluctuations in the anode circuit of the triode 212 are applied to one grid 216 of a dual triode 218, which represents the previously mentioned adder stage 198.

The voltages developed across the other resistor 170 of the diode bridge 165 are applied directly to the other grid 220 of said dual triode 218. The voltages appearing across the resistor 222 in the common anode circuit of the dual triode are indicative of the product of the adjusted and amplified voltages delivered to the diode bridge 165 through transformers 174*a* and 174*b*. From the anode circuit of the dual diode 218 these voltages are applied to the integrator circuit 225. Graph *c* of FIGURE 1, exemplifies the voltage output of the triode 218.

The integrator circuit comprises a resistor 226 and a condenser 228 connected in series. Shunted across the condenser is an operational amplifier 230 to maintain the junction point 232 between resistor 226 and condenser 228 at ground potential in spite of the charges applied to the condenser through resistor 226, which charges would otherwise oppose further charging of the condenser to an increasing degree. In this manner the voltage integration in the condenser 228 is rendered more linear and the results obtained are therefore more accurate. Another resistor 234 is connected across the condenser 228 to allow the charge applied to said condenser to leak off at such a rate that the charge remaining at any instant in the condenser is the average of its charged state for a period of time determined by the value of said resistor. Hence, the output of the operational amplifier is a voltage proportional to the voltage $$e=\frac{I}{T}\int_0^T A\times B\,dt$$

which is the time average of the integral of the product $A\times B$. The hereinbefore discussed graph *d* in FIGURE 1, exemplifies the output of amplifier 230.

While we have illustrated and described a specific integrator circuit that produces exceptionally accurate results, we have found that a conventional low pass filter formed by a resistor, a storage condenser connected between said resistor and ground, and an averaging resistor shunted across the condenser, will operate satisfactorily as an integrator in the correlation circuitry of our invention.

In a practical embodiment of the invention the circuit components shown in FIGURE 7 were as follows:

| | |
|---|---|
| Diodes **240***a*, **240***b* | IN 645. |
| Diodes **161, 162, 163, 164** | IN 34. |
| Triodes **206***a*, **206***b* | ½ of a 6BZ7. |
| Triode **212** | ½ of a 6BZ7. |
| Dual triodes **202***a*, **202***b*, **210***a*, **210***b*, **218** | 6BZ7. |
| Operational amplifier **230** | GAP/R K2X. |
| Condensers **208***a*, **208***b* | 50 micromicrofarads. |
| Condensers **211***a*, **211***b* | 250 micromicrofarads. |
| Condensers **215, 224, 242***a*, **242***b*, **244***a*, **244***b* | 0.1 microfarad. |
| Condenser **246** | 5 microfarads. |
| Condenser **248** | 10 microfarads. |
| Resistors **250***a*, **250***b* | 0.47 megohms. |
| Resistors **204***a*, **240***b* | 3K+2.5K. |
| Resistors **252***a*, **252***b* | 0.47 megohms. |
| Resistors **254***a*, **254***b* | 360 ohms. |
| Resis tors **256***a*, **256***b* | 1.8K. |
| Resistors **258***a*, **258***b* | 1.3K. |
| Resistors **260***a*, **260***b* | 110K. |
| Resistors **262***a*, **262***b*, **282** | 1K. |
| Resistors **264***a*, **264***b* | 4K. |
| Resistors **266***a*, **266***b* | 110 ohms. |
| Resistors **170, 172** | 10 ohms. |
| Resistors **268, 276, 278** | 220 ohms. |
| Resistor **270** | 300 ohms. |
| Potentiometer **214** | 50 ohms. |
| Resistor **272** | 2K. |
| Resistor **274** | .11M. |
| Resistor **222** | 1.5K. |
| Resistor **226** | .11M. |
| Resistor **234** | 0.33M. |
| Resistor **292** | 145K. |
| Resistor **293** | 300K. |
| Resistor **295** | 155K. |
| Resistor **296** | 300K. |
| Variable condenser **228** | .00001 to .1 microfarads. |
| Transformers **174***a*, **174***b* | 2000:2 CT. |

While we have explained our invention with the aid of a certain exemplary embodiment thereof, it will be understood that the invention is not limited to the specific circuit arrangements illustrated and described, and in particular is not limited to the exemplary values of the circuit components listed above, which may be departed from without departing from the spirit and scope of the invention.

We claim:

1. A high frequency analog multiplier comprising four diodes connected to form a bridge circuit, a pair of resistors connected across one set of opposite junctions of said bridge circuit and having their center junction connected to ground, means for applying the signals to be multiplied to said bridge circuit across the other set of opposite junctions thereof and the center junction of said resistors, a voltage adding stage, means for applying the voltages developed across one of said resistors directly to said adding stage, and means for applying the voltages developed across the other resistor in inverted condition directly to said adding stage.

2. A high frequency analog multiplier comprising four diodes connected to form a bridge circuit, a pair of resistors connected across one set of opposite junctions of said bridge circuit and having their center junction connected to ground, means for applying a first signal to said bridge circuit across the other set of opposite junctions thereof, means for applying a second signal to said bridge circuit across a portion of said first signal-applying means and the center junction of said resistors, an adding stage, means for applying the voltages developed across one of said resistors directly to said adding stage, and means for applying the voltages developed across the other resistor in inverted condition directly to said adding stage.

3. A high frequency analog multiplier comprising four diodes connected to form a bridge circuit, a pair of resistors of equal magnitude connected in series across one set of opposite junctions of said bridge circuit and having their center junction connected to ground, means for applying a first signal to said bridge circuit across the other set of opposite junctions thereof, means for applying a second signal to said bridge circuit across a portion of said first signal-applying means and the center junction of said resistors, an adding stage, means for applying voltages developed across one of said resistors directly to said adding stage, and means including a voltage inverter stage for applying voltages developed across the other resistor directly to said adding stage.

4. A multiplier circuit according to claim 3 including means for adjusting the amplification of said voltage inverter stage.

5. A high frequency analog multiplier comprising four diodes connected to form a bridge circuit having a half arranged to conduct negative going signals and a half arranged to conduct positive going signals, a pair of resistors connected in series across the diode junctions of said bridge halves and having their center junction connected to ground, means for applying a first signal to said bridge circuit across the junctions of its halves, means for applying a second signal to said bridge circuit across a portion of said first signal applying means and the center junction of said resistors, a voltage adding stage, means for delivering voltages developed across one of said resistors directly to said voltage adding stage, and means for delivering voltages developed across said other resistor in inverted condition directly to said voltage adding stage to produce in said voltage adding stage voltage sums that are representative of the products of the signals applied to said bridge circuit.

6. A high frequency analog multiplier comprising four diodes connected to form a bridge circuit having a half arranged to conduct negative going signals and a half arranged to conduct positive going signals, a pair of resistors connected in series across the diode junctions of said bridge halves and having their center junction connected to ground, means for applying a first signal to said bridge circuit across the junctions of said bridge halves, means for applying a second signal to said bridge circuit across a portion of said first signal-applying means and the center junction of said resistors, a dual triode having a pair of control grids and an anode circuit, means for delivering voltages developed across one of said resistors directly to one of the control grids of said dual triode, a triode arranged to invert voltages and having a control grid and an anode circuit, means for delivering voltages developed across said other resistor to the grid of said inverter triode, and means for delivering voltages appearing in the anode circuit of said inverter triode directly to the second grid of said dual triode so as to produce in the anode circuit of said dual triode voltages representative of the products of the signals applied to said bridge circuit.

7. A high frequency analog multiplier comprising four diodes connected to form a bridge circuit having a half arranged to conduct negative going signals and a half arranged to conduct positive going signals, a pair of resistors of equal magnitude connected in series across the diode junctions of said bridge halves and having their center junction connected to ground, a transformer having a secondary winding connected across the junctions of said bridge halves to apply a signal to said bridge circuit, a second transformer having a center-tapped secondary winding and having one half of said center-tapped secondary winding connected across a center tap of the secondary winding of said first transformer and the center junction of said resistors to apply another signal to said bridge circuit, a dual triode having a pair of control grid and an anode circuit, mean for delivering voltages developed across one of said resistors directly to one of the control grids of said dual triode, and means including a triode connected to invert voltages and a potentiometer operable to adjust the amplification of said triode for delivering voltages developed across said other resistor in inverted condition directly to the other grid of said dual triode so as to produce in the anode circuit of said dual triode voltages representative of the product of the signals applied to said diode bridge circuit through said first and second transformers.

References Cited by the Examiner

UNITED STATES PATENTS

| | | | |
|---|---|---|---|
| 2,676,206 | 4/54 | Bennett et al. | 235—181 X |
| 2,854,191 | 9/58 | Raisbeck | 235—181 |
| 2,897,477 | 7/59 | Lindsey | 235—181 X |
| 2,902,219 | 9/59 | Wilcox | 235—194 |
| 2,906,459 | 9/59 | Lovell | 235—194 |
| 2,921,739 | 1/60 | Tolles | 235—194 |
| 3,021,074 | 2/60 | Groenendyke | 235—194 |

MALCOLM A. MORRISON, *Primary Examiner.*